(12) United States Patent
Winberg et al.

(10) Patent No.: US 9,352,784 B2
(45) Date of Patent: May 31, 2016

(54) ADAPTER FOR CRUSH RAIL AND TORQUE BOX

(71) Applicant: Tesla Motors, Inc., Palo Alto, CA (US)

(72) Inventors: N. Petter Winberg, Hayward, CA (US); Timothy L. Sheldon, Mountain House, CA (US); Sachin Shrimant Sawant, Newark, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 14/255,895

(22) Filed: Apr. 17, 2014

(65) Prior Publication Data
US 2015/0298740 A1    Oct. 22, 2015

(51) Int. Cl.
*B62D 25/08* (2006.01)
*B62D 21/15* (2006.01)

(52) U.S. Cl.
CPC ............ *B62D 21/152* (2013.01); *B62D 25/082* (2013.01)

(58) Field of Classification Search
CPC .... B62D 21/152; B62D 25/20; B62D 25/082; B62D 25/2018; B62D 21/155; B62D 21/157; B62D 25/025; B62D 25/2036; B62D 21/15; B60K 1/04; B60K 2001/0438
USPC .............. 296/187.09, 203.02, 187.1, 187.12, 296/193.09, 209, 187.08, 193.06, 193.07, 296/204; 280/777; 293/132
See application file for complete search history.

(56) References Cited

U.S. PATENT DOCUMENTS

| | | | |
|---|---|---|---|
| 5,884,963 A * | 3/1999 | Esposito et al. | 296/187.09 |
| 6,676,200 B1 * | 1/2004 | Peng | 296/204 |
| 6,808,039 B2 | 10/2004 | Roehringer et al. | |
| 7,537,273 B2 | 5/2009 | Lassl et al. | |
| 7,614,658 B2 * | 11/2009 | Yamada | 280/784 |
| 7,963,588 B2 * | 6/2011 | Kanagai et al. | 296/187.12 |
| 8,002,338 B2 * | 8/2011 | Yasuhara et al. | 296/203.02 |
| 8,496,268 B2 | 7/2013 | Theodore | |
| 8,573,683 B2 | 11/2013 | Gadhiya et al. | |
| 2004/0201256 A1 | 10/2004 | Caliskan et al. | |
| 2012/0056447 A1 | 3/2012 | Yoshida | |
| 2012/0119546 A1 * | 5/2012 | Honda et al. | 296/203.01 |
| 2012/0175897 A1 | 7/2012 | Rawlinson et al. | |
| 2012/0175899 A1 | 7/2012 | Gadhiya et al. | |
| 2012/0175900 A1 | 7/2012 | Rawlinson | |
| 2012/0175916 A1 | 7/2012 | Rawlinson et al. | |
| 2013/0088045 A1 | 4/2013 | Charbonneau et al. | |

OTHER PUBLICATIONS

International search report in application PCT/US2015/026346, Aug. 13, 2015, 10 pages.

\* cited by examiner

*Primary Examiner* — Glenn Dayoan
*Assistant Examiner* — Sunsurraye Westbrook
(74) *Attorney, Agent, or Firm* — J. Richard Soderberg

(57) ABSTRACT

An adapter for a vehicle includes: an adapter body configured to bridge between a crush rail at a vehicle end and a back-up structure, the adapter body having a socket configured to receive and enclose four sides of the crush rail, the adapter body having a plug configured to fit into the back-up structure; and an opening in the adapter body configured to have a drive shaft extend through the adapter.

18 Claims, 5 Drawing Sheets

ADAPTER FOR CRUSH RAIL AND TORQUE BOX

BACKGROUND

Vehicles are generally designed with an eye toward the possibility of forceful impact, whether that be the result of the vehicle hitting another stationary or moving object, or due to the vehicle being run into by something (e.g., another vehicle). For this reason, crash-absorbing structures can be provided in the front and rear of the vehicle. One purpose of crash-absorbing structures can be to direct crash forces away from certain areas of the vehicle, such as the passenger compartment or sensitive components, such as an energy storage (e.g., a battery pack or a fuel tank).

SUMMARY

In a first aspect, an adapter for a vehicle includes: an adapter body configured to bridge between a crush rail at a vehicle end and a back-up structure, the adapter body having a socket configured to receive and enclose four sides of the crush rail, the adapter body having a plug configured to fit into the back-up structure; and an opening in the adapter body configured to have a drive shaft extend through the adapter.

Implementations can include any or all of the following features. The vehicle end is a vehicle front end, wherein the socket is forward facing, and wherein the plug is rearward facing. The socket comprises first and second surfaces configured to abut respective portions of a rear end of the crush rail. The second surface is positioned closer to the back-up structure than the first surface. The crush rail has a cross section profile comprising first, second and third cells that are substantially square, and wherein the adaptor is configured so that the first and second cells abut the first surface, and so that the third cell abuts the second surface. The first surface has at least three side walls configured to abut the first and second cells. The second surface has at least three side walls configured to abut the third cell. The vehicle end is a vehicle front end, and wherein the first and second surfaces are forward facing. The opening has a recess located downward of the drive shaft. The recess extends below the crush rail. The opening has a recess located between the drive shaft and the back-up structure. The vehicle end is a vehicle front end, and wherein the recess is located rearward of the drive shaft. The recess extends past the crush rail. The plug has a cross section profile comprising octagons adjacent each other. The plug has a cross section profile comprising a rectangle. The adapter is made from cast aluminum. The adapter is configured to deform in response to crushing of the crush rail. The back-up structure comprises a torque box.

DETAILED DESCRIPTION

This document describes examples of systems and techniques for accommodating a drive shaft that extends through a crash load path. For example, an adapter can have an opening for the drive shaft, while allowing a vehicle crush rail to direct the crash forces into a suitable back-up structure behind the adapter, such as a torque box. This accommodation of the drive shaft can allow the crash load path to stay at a low level vertically (i.e., at a low Z level in the vehicle). The adapter can be configured to be at least partially sacrificial and absorb energy of the impact.

Figure 1:
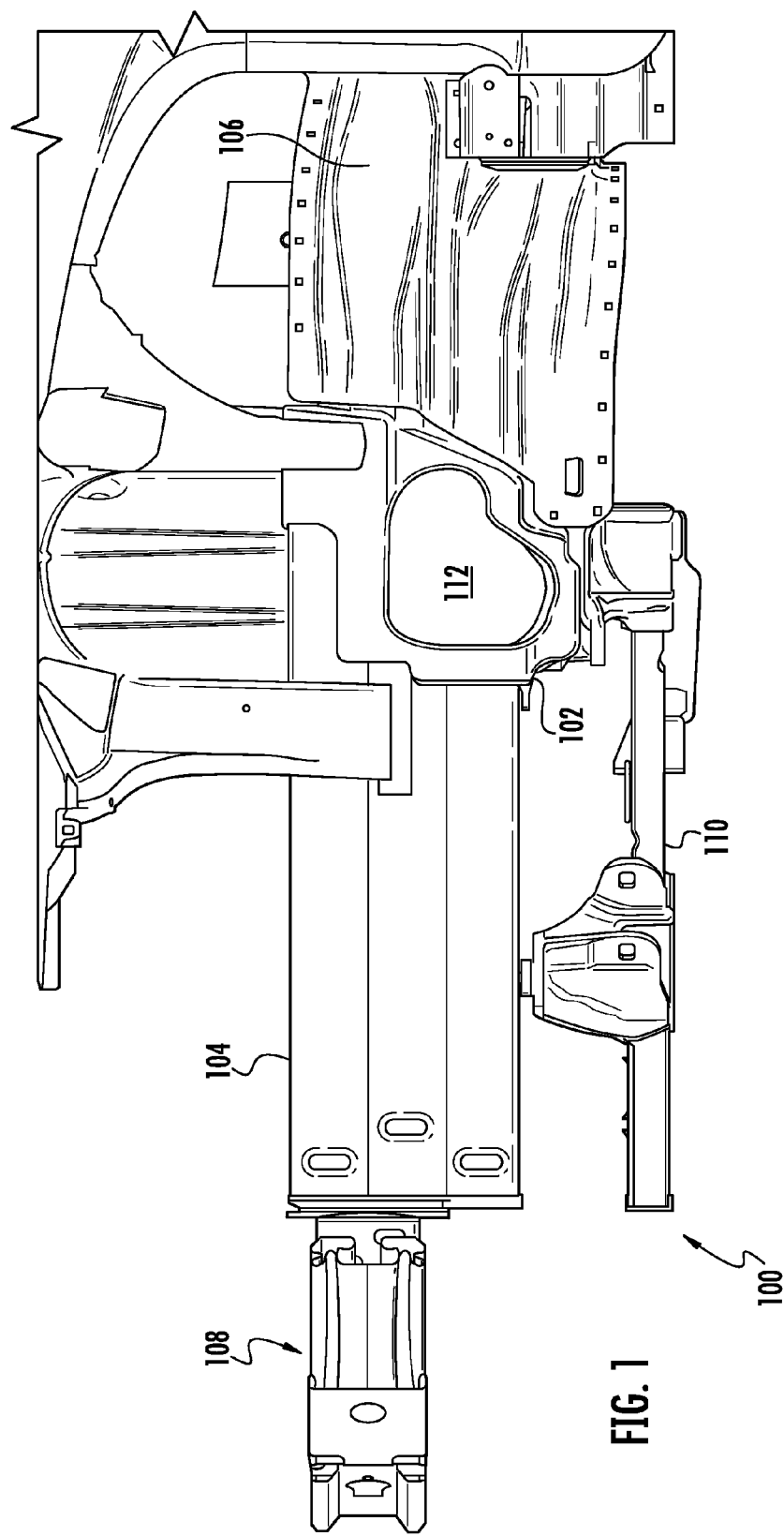
FIG. 1 shows a side view of an example of a vehicle front end having an adapter, a crush rail and a torque box.

FIG. 1 shows a side view of an example of a vehicle front end 100 having an adapter 102, a crush rail 104 and a torque box 106. Some portions of the vehicle front end are omitted for clarity of illustration. By way of example, a bumper system 108 can be mounted on the crush rail, and the crush rail can be supported by the adapter. A vehicle subframe 110, moreover, can have certain vehicle components mounted thereon (e.g., steering components, a compressor, and/or a pump). The subframe can be suspended from the crush rail and the torque box. The adapter has an opening 112.

In the event of frontal impact, the bumper system 108 can be the first component that receives the force of the impact. From there, the crash force is directed into the crush rail 104, which can be configured to at least partially collapse (or be crushed) as a result. In so doing, the crush rail conveys some of the crash force into the adapter 102. From there, crash force is directed into the torque box 106, which may be configured to laterally redirect the force sideways, for example onto a vehicle side sill or other frame structure. The subframe 110, finally, can be configured to at least partially collapse, or otherwise deform, as a result of the impact. For example, the collapse/deformation can detach the subframe from the crush rail.

That is, the adapter 102 bridges between the crush rail 104 and the torque box 106. The adapter also accommodates a drive shaft (not shown) through the opening 112. In so doing, the adapter eliminates the need to position the crash absorption structure higher in the vehicle, which would have introduced higher Y-moments on the supporting vehicle compartment structure, or "back-up structure".

The adapter can be positioned at a vehicle front end, for example the vehicle front end 100 as illustrated. In some implementations, the vehicle has a motor at the front end, and the adapter can then facilitate driving of the front wheel(s) by the motor. The motor may be paired with another motor that drives the vehicle's rear wheels, or it may be the only traction unit.

Figure 2:
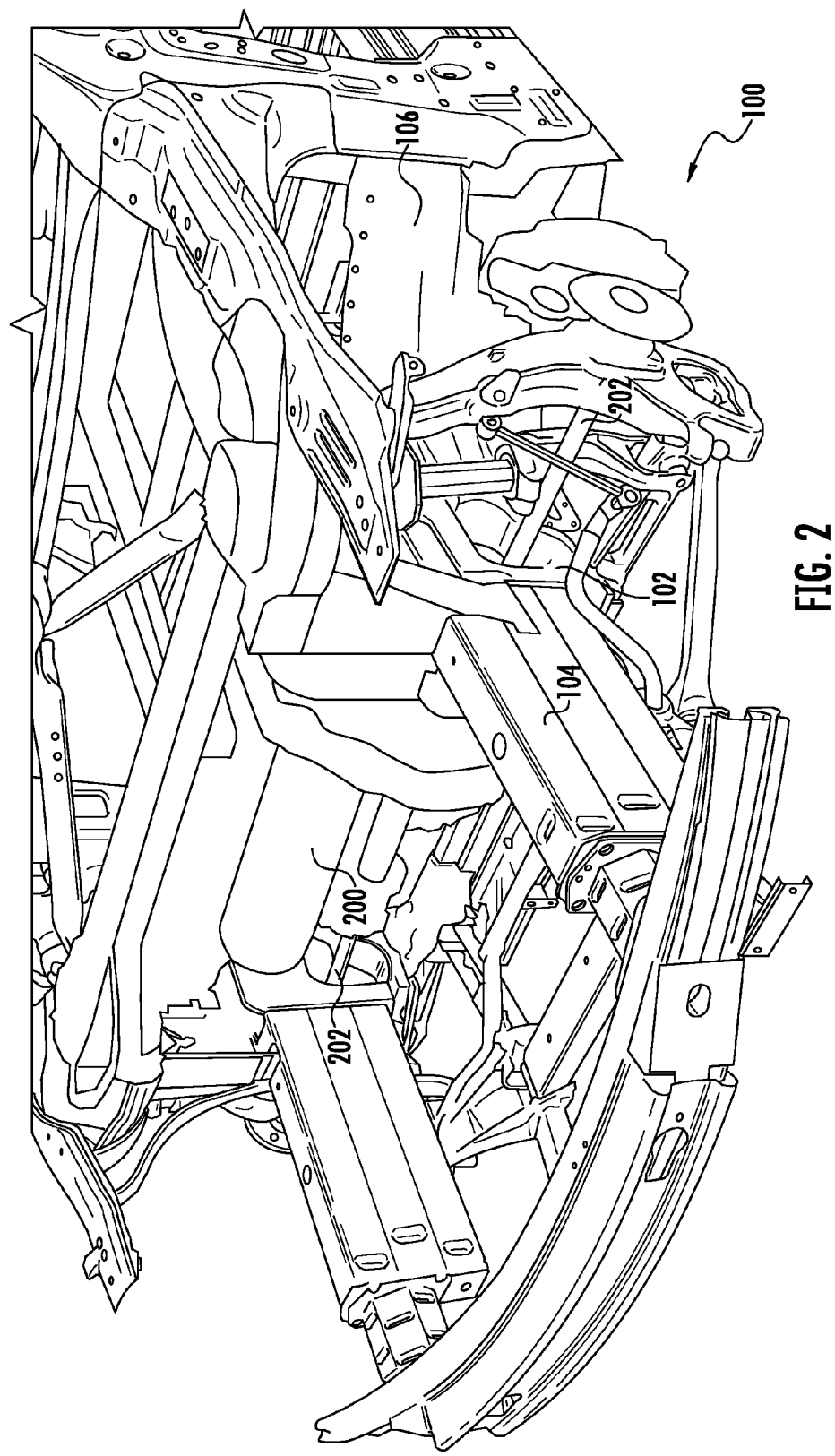
FIG. 2 shows a perspective view of the vehicle front end of FIG. 1.

FIG. 2 shows a perspective view of the vehicle front end 100 of FIG. 1. This example shows that the vehicle has two of the crush rails 104, each having a corresponding one of the adapters 102 and one of the torque boxes 106. Also shown is a motor 200 located in the front of the vehicle, the motor configured to drive each of the front wheels by a respective drive shaft 202. Each of the adapters accommodates its respective drive shaft by way of the opening through the adapter.

Figure 3:
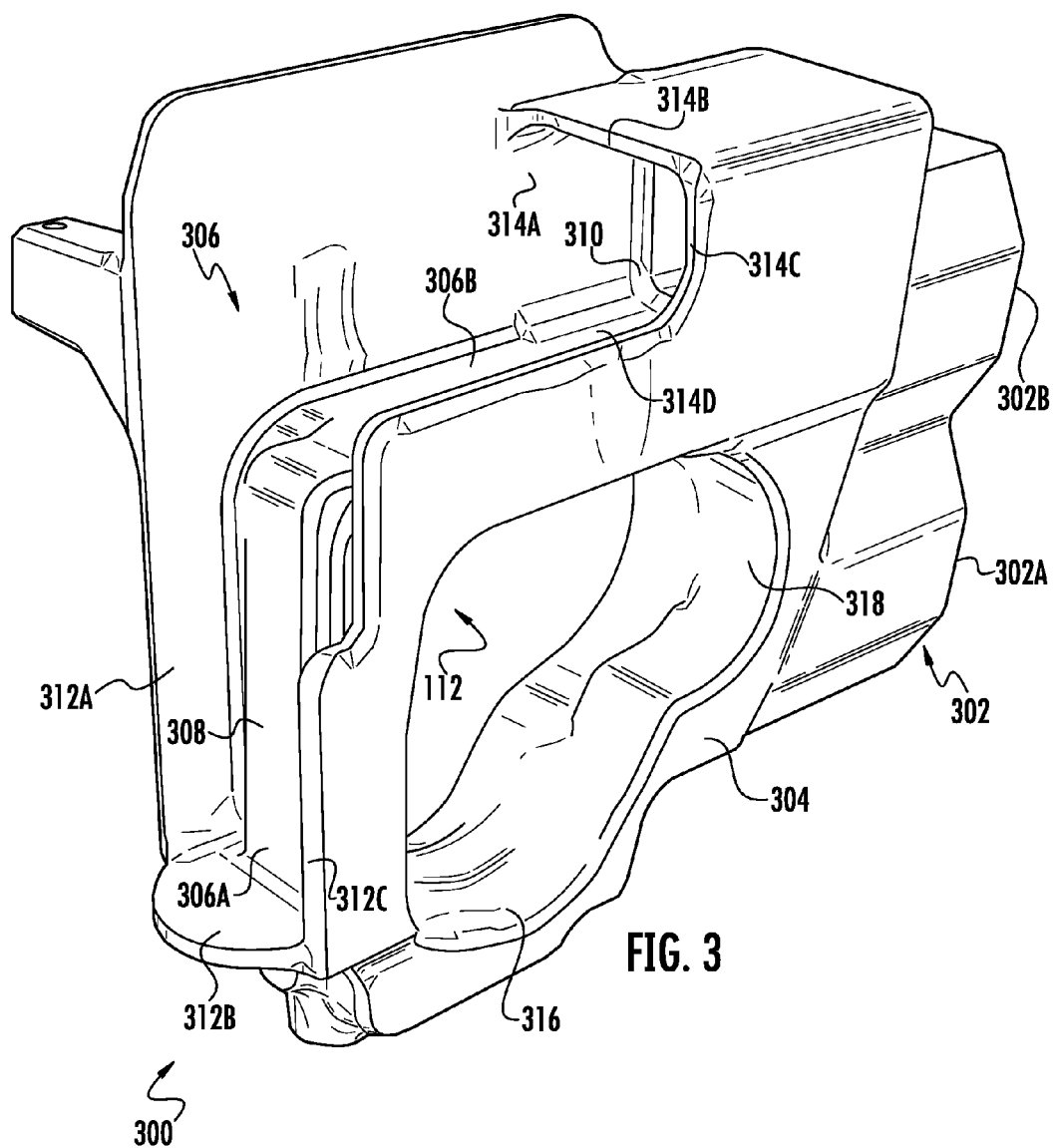
FIG. 3 shows an example of an adapter having a plug with an octagonal shape.

FIG. 3 shows an example of an adapter 300 having a plug 302 with an octagonal shape. The plug is situated at the adapter end that is farther away from the impact (that is, at the rear end when the adapter is positioned at the vehicle's front end). The configuration of the plug allows the adapter to be mounted to a particular shape of torque box. The adapter can be manufactured using any suitable technique, including, without limitation, by casting. For example, the adapter can be made of aluminum.

In some implementations, the adapter 300 may be used with a torque box that requires the incoming member to have an octagon-based profile. For example, this may be because the torque box is alternatively intended to have a crush rail inserted directly into it, without any adapter between them. This configuration can be used in the front of a vehicle that has crush rails of this particular octagon-based shape, wherein there is no front motor and therefore no need to accommodate a drive shaft through the path of impact force.

Thus, the adapter 300 can have the plug 302 that features an octagon-based profile suited to fit into a particular torque box. The plug can do so by having a first plug section 302A that has an essentially octagonal shape, and a second plug section 302B also of an essentially octagonal shape with one of its sides coinciding with a corresponding side of the first plug section. As noted above, this shape of the plug can approximately correspond to the cross-section profile of a particular crush rail. However, one advantage of the adapter is that it allows the same torque box to also be used with another crush rail (e.g., the crush rail 104 in FIGS. 1-2) that does not have the same cross-section profile.

The adapter can comprise an adapter body 304 that has the plug 302 extending therefrom, and that also features a socket region 306. The socket region can include a first socket 306A and a second socket 306B. The socket region is configured for receiving the end of the crush rail that is opposite from the end receiving the crash impact. For example, when the adapter is at the vehicle front end, the socket region would receive the rear end of the crush rail.

That is, the socket region 306 is configured for receiving the crash force conveyed through one end of the crush rail. For this and other purposes, each of the first and second sockets 306A-B can have at least one surface for opposing the force. Here, the first socket 306A has a surface 308, and the second socket 306B has a surface 310. Here, the surface 310 is located closer to the torque box than is the surface 308. That is, in a vehicle front-end implementation, the surface 310 is the rearward one of the two surfaces.

Each of the surfaces 308-310 is essentially vertical and is configured to have part of the end of the crush rail abutting against it. For example, the crush rail may have a cross section profile comprising first, second and third cells that are substantially square (see, for example, the crush rail 104 in FIG. 2). The adapter can then be configured so that each of the first and second cells of the crush rail abuts the surface 308, and so that the third cell abuts the surface 310. Other implementations can have the crush-rail cells abutting against surfaces in different ways, or can be used with a different type of crush rail.

Each of the surfaces 308 and 310 can have side walls that help the socket region 306 firmly receive and hold the end of the crush rail. Here, the surface 308 has side walls 312A-C that surround three sides of the corresponding corner of the crush rail. The surface 310, in turn, has side walls 314A-D that surround four sides of the corresponding corner of the crush rail.

The opening 112 can have any suitable shape depending on the particular implementation, including, but not limited to, the size and intended operation of the drive shaft, the process of installing the adapter and/or the drive shaft, and the desired amount of crash absorption that the adapter should provide. Here, the opening has a recess 316 that is located downward of the drive shaft. In some implementations, the recess 316 extends below the crush rail (i.e., here it extends below the side wall 312B). Here, the opening 112 also has a recess 318 located between the drive shaft and the torque box. In some implementations, the recess 318 extends past the crush rail (i.e., here it extends beyond the surface 310). For example, the recess 316 and/or 318 can accommodate downward or sideways movement of the drive shaft, and/or can simplify installation or service operations.

Figure 4:
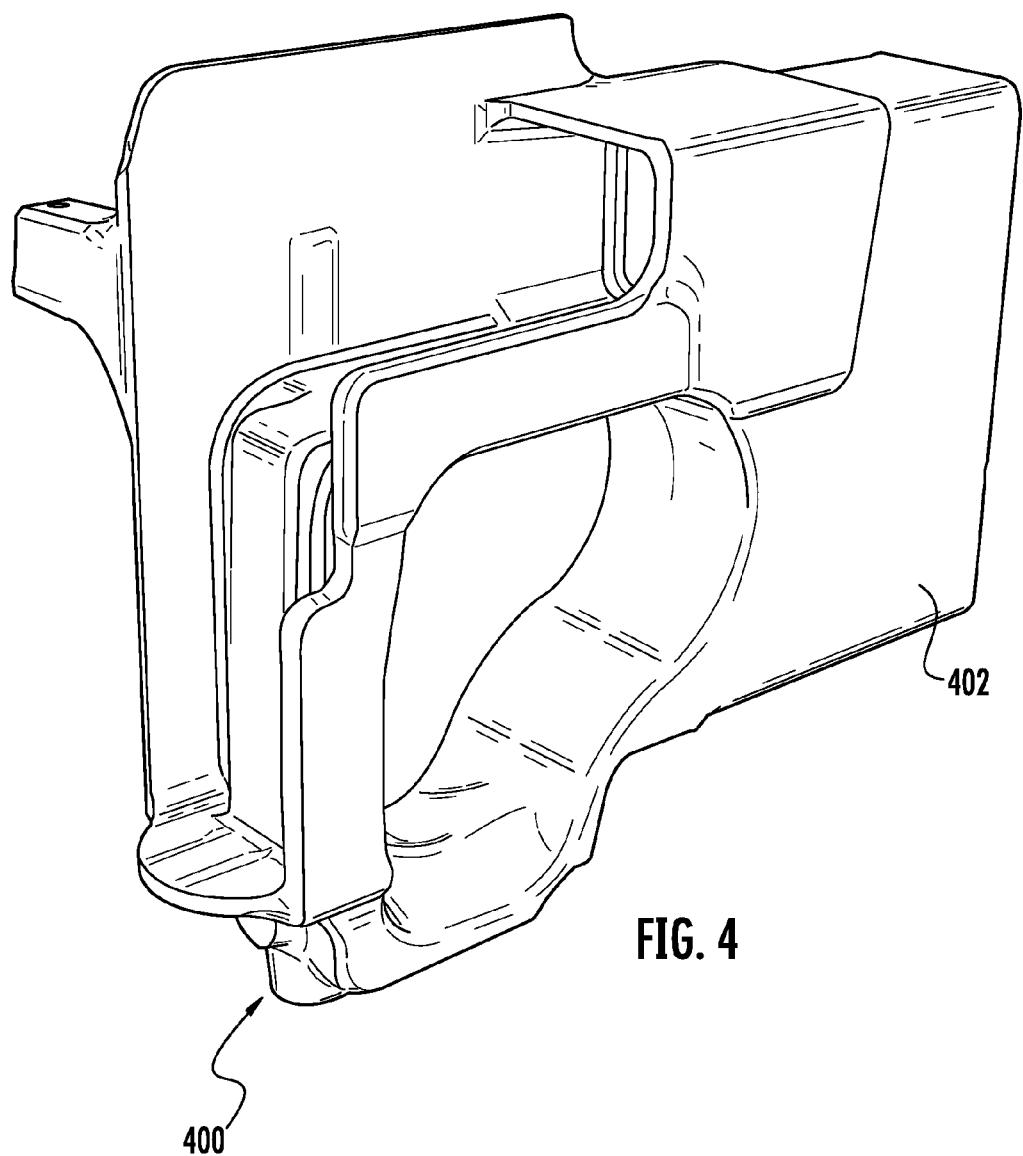
FIG. 4 shows an example of an adapter having a plug with a rectangular shape.

FIG. 4 shows an example of an adapter 400 having a plug 402 with a rectangular shape. Other parts of the adapter 400 can be similar or identical to corresponding parts of the adapter 300 in FIG. 3 and are therefore not described in detail here.

The cross-section profile of the plug 402 makes the adapter suited to fit into a particular torque box. The rectangular shape of the plug can approximately correspond to the cross-section profile of a particular crush rail (e.g., the crush rail 104 in FIGS. 1-2). That is, one advantage of the adapter is that it allows the same torque box to also be used with another crush rail that does not have the same cross-section profile.

Thus, the adapter 300 (FIG. 3) and the adapter 400 (FIG. 4) are examples of adapters that serve to direct impact energy from a crush rail into designated back-up structures (e.g., ultimately into a side sill). In some implementations, an adapter is configured to not only convey impact forces but also to absorb some of the crash energy by way of deformation. For example, an adapter casting can be tuned in terms of strength to support the crush rail, and after the crush rail is fully collapsed/deformed, to crack and hence further relieve forces on the back-up structure.

Figure 5:
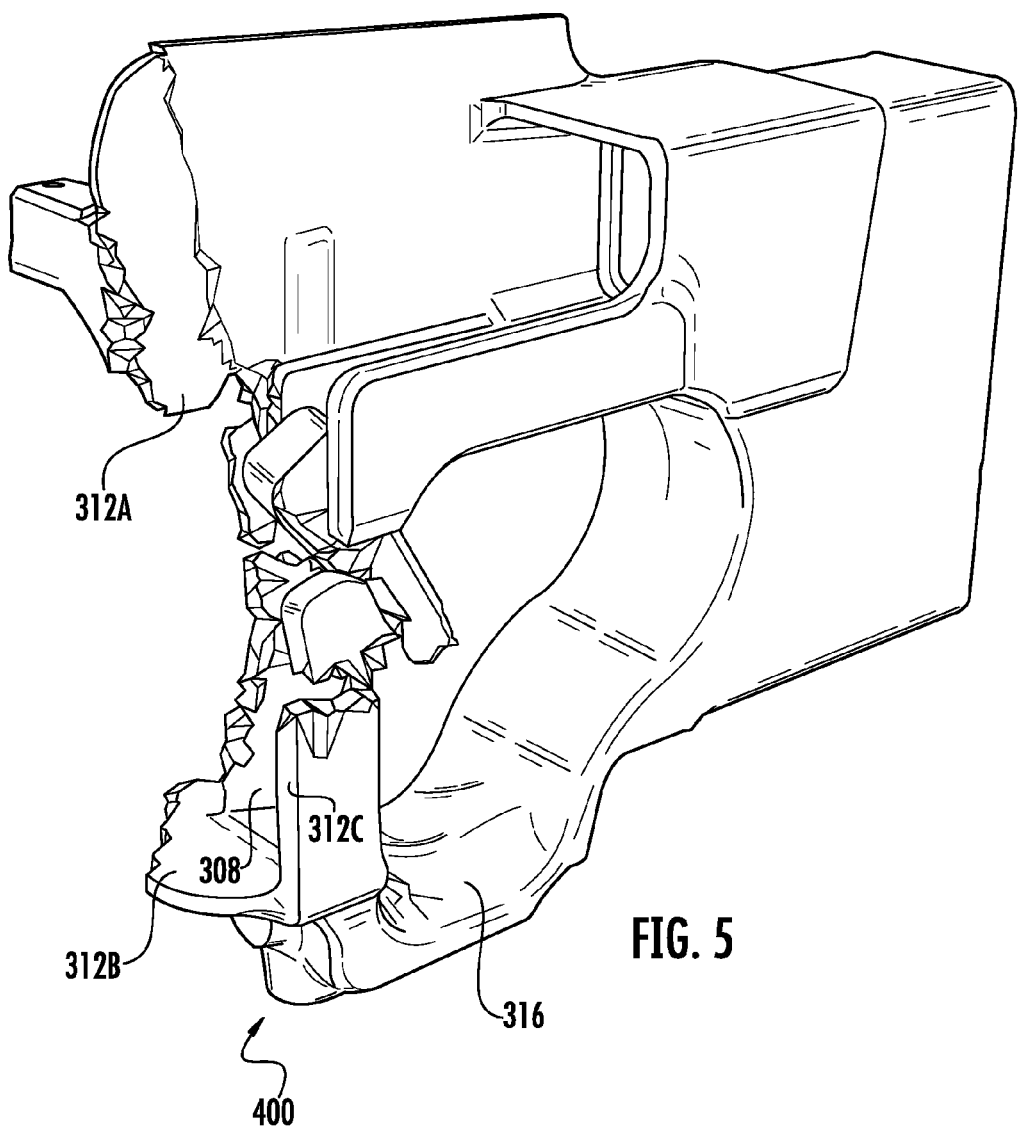
FIG. 5 shows an example of the adapter of FIG. 4 in a partially crushed state.

FIG. 5 shows an example of the adapter 400 of FIG. 4 in a partially crushed state. That is, the impact energy conveyed by a crush rail has caused the adapter to deform and fracture into the partially crushed state. The adapter thereby helps control the received impact forces and dissipate them in a less dangerous way. The exact deformation that the adapter will undergo is highly dependent on the particular implementation and also on the size, direction and duration of the impact. In this example, the impact has cause destructive deformation in at least the surface 308, the side walls 312A-C, and in the recess 316.

A number of implementations have been described as examples. Nevertheless, other implementations are covered by the following claims.

What is claimed is:

1. An adapter for a vehicle comprising:
   an adapter body configured to bridge between a crush rail at a vehicle end and a back-up structure, the adapter body having a socket configured to receive and enclose four sides of the crush rail, the adapter body having a plug configured to fit into the back-up structure; and
   an opening in the adapter body configured to have a drive shaft extend through the adapter.

2. The adapter of claim 1, wherein the vehicle end is a vehicle front end, wherein the socket is forward facing, and wherein the plug is rearward facing.

3. The adapter of claim 1, wherein the socket comprises first and second surfaces configured to abut respective portions of a rear end of the crush rail.

4. The adapter of claim 3, wherein the second surface is positioned closer to the back-up structure than the first surface.

5. The adapter of claim 4, wherein the crush rail has a cross section profile comprising first, second and third cells that are substantially square, and wherein the adapter is configured so that the first and second cells abut the first surface, and so that the third cell abuts the second surface.

6. The adapter of claim 4, wherein the first surface has at least three side walls configured to abut the first and second cells.

7. The adapter of claim 6, wherein the second surface has at least three side walls configured to abut the third cell.

8. The adapter of claim 3, wherein the vehicle end is a vehicle front end, and wherein the first and second surfaces are forward facing.

9. The adapter of claim 1, wherein the opening has a recess located downward of the drive shaft.

10. The adapter of claim 9, wherein the recess extends below the crush rail.

11. The adapter of claim 1, wherein the opening has a recess located between the drive shaft and the back-up structure.

12. The adapter of claim 11, wherein the vehicle end is a vehicle front end, and wherein the recess is located rearward of the drive shaft.

13. The adapter of claim 11, wherein the recess extends past the crush rail.

14. The adapter of claim 1, wherein the plug has a cross section profile comprising octagons adjacent each other.

15. The adapter of claim 1, wherein the plug has a cross section profile comprising a rectangle.

16. The adapter of claim 1, made from cast aluminum.

17. The adapter of claim 1, configured to deform in response to crushing of the crush rail.

18. The adapter of claim 1, wherein the back-up structure comprises a torque box.

\* \* \* \* \*